(12) United States Patent
Wang

(10) Patent No.: US 6,681,900 B2
(45) Date of Patent: Jan. 27, 2004

(54) ELECTRIC BRAKE ACTUATOR

(75) Inventor: Nui Wang, Croydon (AU)

(73) Assignee: PBR Australia Pty. Ltd. (AU)

( * ) Notice: Subject to any disclaimer, the term of this patent is extended or adjusted under 35 U.S.C. 154(b) by 0 days.

(21) Appl. No.: 10/216,078

(22) Filed: Aug. 9, 2002

(65) Prior Publication Data

US 2003/0070884 A1 Apr. 17, 2003

Related U.S. Application Data

(63) Continuation of application No. PCT/AU01/00106, filed on Feb. 7, 2001.

(30) Foreign Application Priority Data

Feb. 11, 2000 (AU) ................................................ PQ5584

(51) Int. Cl.[7] .............................. B60L 7/00; B60T 7/08; B60T 13/74; F16D 65/30; F16D 65/34

(52) U.S. Cl. ........................ 188/2 D; 188/156; 188/158; 188/162; 188/106 P; 74/625

(58) Field of Search .................................. 188/2 D, 156, 188/158, 162, 106 P, 106 R; 74/625, 388 R, 471 R, 500.5, 501.5 R, 501.6, 505, 502.6, 502.5, 89.2, 41, 89.22, 10.7, 502.4; 254/378, 264, 362, 273, 286; 242/396.5, 388.8, 371, 478.2, 481.4; 318/366, 362; 49/28, 280, 358; 474/64

(56) References Cited

U.S. PATENT DOCUMENTS

| | | | | |
|---|---|---|---|---|
| 2,018,915 A | * | 10/1935 | House | |
| 2,245,958 A | * | 6/1941 | Barr et al. | |
| 2,825,428 A | * | 3/1958 | Stiebinger | |
| 2,933,159 A | * | 4/1960 | Stiebinger | |
| 3,353,634 A | * | 11/1967 | Farrar | |
| 3,638,766 A | * | 2/1972 | Besoyan | |
| 4,795,002 A | * | 1/1989 | Burgei et al. | 188/2 D |
| 4,865,165 A | * | 9/1989 | Taig | |
| 5,690,193 A | * | 11/1997 | Baumann et al. | 188/72.9 |
| 6,193,022 B1 | | 2/2001 | Bode | 188/2 D |

FOREIGN PATENT DOCUMENTS

| | | | | |
|---|---|---|---|---|
| DE | 3113362 | * | 10/1982 | |
| DE | 3904460 | * | 8/1990 | |
| DE | 39 09 907 A1 | | 9/1990 | B60T/8/32 |
| DE | 41 29 934 A1 | | 3/1993 | B60T/13/02 |
| DE | 198 18 339 C1 | | 2/2000 | B60T/13/74 |
| EP | 0936112 | * | 8/1999 | |
| FR | 2760711 | * | 9/1998 | |
| WO | WO 03/008248 A1 | * | 1/2003 | |

OTHER PUBLICATIONS

Translation of DE 3909907.*
Translation of DE 4129934.*
Translation of DE 19818339.*
Translation of DE 3113362.*

* cited by examiner

Primary Examiner—Douglas C. Butler
(74) Attorney, Agent, or Firm—Schwegman, Lundberg, Woessner & Kluth, P.A.

(57) ABSTRACT

An electric brake actuator for actuating a brake arrangement. The actuator includes an electric drive unit (15, 15') and a load multiplier (17). the electric drive unit (15, 15') is in cable connection through a first cable unit (16, 16') with the load multiplier and the load multiplier (17) is arranged for cable connection through a second cable unit (19) with the brake arrangement. Whereby the electric drive unit (15, 15') is operable to apply a load to the load multiplier (17) through the first cable unit (16, 16') and the load multiplier (17) is operable to multiply the load for application to the brake arrangement through the second cable unit (19).

23 Claims, 3 Drawing Sheets

ELECTRIC BRAKE ACTUATOR

RELATED APPLICATIONS

This application is a continuation under 35 U.S.C. 111(a) from International Application No. PCT/AU01/00106 filed Feb. 7, 2001 and published in English on Aug. 16, 2001 as WO 01/58738 A1, which claims priority from Australian Application No. PQ 5584 filed Feb. 11, 2000, which applications and publication are incorporated herein by reference.

FIELD OF THE INVENTION

The present invention relates to an electric brake actuator for actuating a brake arrangement. It will be convenient to describe the invention in relation to its application to the parking brake arrangement of a vehicle, although it is to be appreciated that the invention could have other applications, such as its actuating of brake arrangements in general.

BACKGROUND OF THE INVENTION

Electric brake actuators have been considered in recent times as being attractive for parking brake actuation, by facilitating removal of the need for manual parking brake actuation by the vehicle driver and by providing greater control of the braking force which is applied. As yet however, an electric parking brake actuator that is generally acceptable to the automotive industry has not been provided.

It is an object of the present invention to provide an electric parking brake actuator for use in the automobile industry and which meets with general acceptance in that industry.

SUMMARY OF THE INVENTION

According to the present invention there is provided an electric parking brake actuator for actuating the parking brake arrangement of a vehicle, said actuator including an electric motor and a load multiplier, said electric motor being in cable connection through a first cable means (unit) with said load multiplier and said load multiplier being arranged for cable connection through a second cable means (unit) with said parking brake arrangement, whereby said electric motor is operable to apply a load to said load multiplier through said first cable means and said load multiplier is operable to multiply said load for application to said parking brake arrangement through said second cable means.

The present invention further provides a vehicle having an electric brake actuator for actuating the brake arrangement thereof, said actuator including an electric drive unit and a load multiplier, said electric drive unit being in cable connection through a first cable means with said load multiplier and said load multiplier being in cable connection through second cable means with said brake arrangement, whereby said electric drive unit is operable to apply a load to said load multiplier and said load multiplier is operable to multiply said load and apply said multiplied load to said brake arrangement, via said respective cable connections.

The above arrangement is advantageous because the load required to be applied by the actuator is significantly less than that applied to the parking brake arrangement. Because of this, the cable for driving the load multiplier can be relatively light grade compared to the cable extending from the load multiplier to the parking brake arrangement. Thus, the cable for driving the load multiplier can be relatively thin and flexible, which permits the load multiplier to be of reasonably small construction, so as to be unobtrusive where it is fixed to the vehicle. Additionally, being of light grade, the cable, if required, can be easily routed about the vehicle to which it is applied as necessary. Advantageously, this can permit the electric drive unit to be placed in an easily accessible position, such as within the cabin of the vehicle.

Accessibility is desirable, because preferably the parking brake arrangement is required to be manually operable in the event of failure of the electric drive unit or the power source supplying the electric drive unit and in that event, it is preferable that the driver of the vehicle can manually operate the electric drive unit, most preferably from the driver's seat, because such failure will generally require the service brakes to be operated (normally foot operated) until such time as the parking brake arrangement can be manually applied.

Alternatively the electric drive unit could be located remote from the driver, but be manually actuable in the region of the driver's seat. In this arrangement for example, the electric drive unit may be positioned adjacent the load multiplier and may even be connected to it or formed integrally with it, or it alternatively may be located in the engine bay. Regardless of the position of the electric drive unit, in this arrangement, an emergency or manual cable of light grade may be operable to manually actuate the parking brake arrangement through the load multiplier, either by bypassing the electric drive unit or by operating the drive unit manually. For example, the emergency cable may be an extension of the cable acted on by the electric drive unit, or in an alternative arrangement, it may be separately connected to the load multiplier, so as to actuate the load multiplier independently of the electric drive unit. The cable may have a handle at the free end thereof and because of the light grade of the cable, the cable can be easily routed so that the handle can conveniently be positioned for manual actuation, such as below the dashboard, or beneath the driver's seat.

By the above arrangements, the load multiplier can also be placed in the most suitable position in the vehicle. That may also be within the vehicle cabin, but more likely, it will be outside of the cabin, such as fixed to the undercarriage toward the rear of the vehicle. Unlike the electric drive unit, the position of the load multiplier is preferably close to the rear axle, because the cable or cables extending between the load multiplier and the parking brake arrangement, which typically includes two parking brake assemblies operable on each of two rear wheels of a vehicle, is of relatively heavy grade, with limited flexibility for routing about the vehicle. Thus, a generally direct connection is required. However the present invention advantageously accommodates this requirement as the load multiplier can be positioned relatively close to the parking brake assemblies.

A load multiplier can take any suitable form and in a preferred form, it includes a plurality of pulley groups, a first of which is anchored against shifting movement, while a second group is movable toward and away from the first group. Each pulley group includes at least a single pulley, but preferably more than one. The electric drive unit can also take any suitable form and hereinafter it will be described as at least including an electric motor, although that is for convenience only. The electric drive unit could include a form of drive other than an electric motor and may include other components, such as control components, electrical supply components or supplemental load multiplier components.

The electric motor cable (hereinafter "the motor cable") threads or extends about the first and second pulley groups, while the parking brake arrangement cable or cables (hereinafter "the assembly cables") extend from the second pulley group. The pulley or pulleys of each group may be mounted to rotate on an axle, the ends of which are connected to a yoke-like member to which cables can conveniently be attached. The number of pulleys in each group dictates the load multiplication applied to the assembly cable.

In a preferred arrangement, two assembly cables extend from the load multiplier, each extending to a separate parking brake assembly provided at each of two wheels of the vehicle. Alternatively a single cable may extend from the load multiplier for connection with a further cable arrangement that extends to each of the two parking brake assemblies.

The load multiplier can alternatively include an anchor to which one end of the motor cable is attached, while the pulley groups about which the motor cable extends are mounted to float linearly toward and away from each other. In this arrangement, a load applied to the motor cable can draw the pulley groups toward each other against biasing means biasing them apart and that movement can be transmitted either directly or indirectly to the assembly cables. This arrangement advantageously facilitates equal load being applied to each assembly cable as the pulley groups can float relative to one another against the biasing means. In this arrangement, each pulley group may be mounted on an axle as described above, the ends of which extend beyond each side of the respective pulley group and into engagement with a yoke-like member to which a cable connected to each parking brake assembly may extend.

In a further alternative arrangement, the load multiplier includes a second pulley group or pair of pulley groups disposed between the first pair of pulley groups and diverting the path of the motor cable within the load multiplier. In this arrangement, assembly cables can be fixed to each of the first pulley groups, while the opposite ends of the motor cable which extends about each of the first pair of pulley groups and the or each of the second pulley groups, may be attached respectively to the electric motor and a manual actuator. By this arrangement, a load can be applied to the assembly pulley groups by either the electric motor, or by manual actuation. Advantageously, the second pair of pulley groups can be arranged to guide the motor cable in such a manner that the assembly cables extend from the load multiplier in an appropriate direction. In a preferred arrangement, the second pair of pulley groups is laterally offset different amounts along a centre-line between the first pair of pulleys in substantially the same plane as the cable path between the first pair of pulley groups.

In an electric actuator according to the invention, a second load multiplier may be employed and in one preferred arrangement, the second load multiplier is spaced from the first load multiplier, such as at or closer to the electric drive unit. That load multiplier can also take any suitable form and in this respect, either load multiplier can be of the form described above, or alternatively it could be of a different form, such as a screw and nut form or, a worm and wheel form. In this arrangement, the load multiplication provided may be split either equally or unequally between the first and second load multipliers and the use of two load multipliers may facilitate smaller componentry, greater load multiplication, or more flexible layout of components.

BRIEF DESCRIPTION OF THE DRAWINGS

The attached drawings show example embodiments of the invention of the foregoing kind. The particularity of those drawings and the associated description does not supersede the generality of the preceding broad description of the invention.

DETAILED DESCRIPTION

Figure 1:
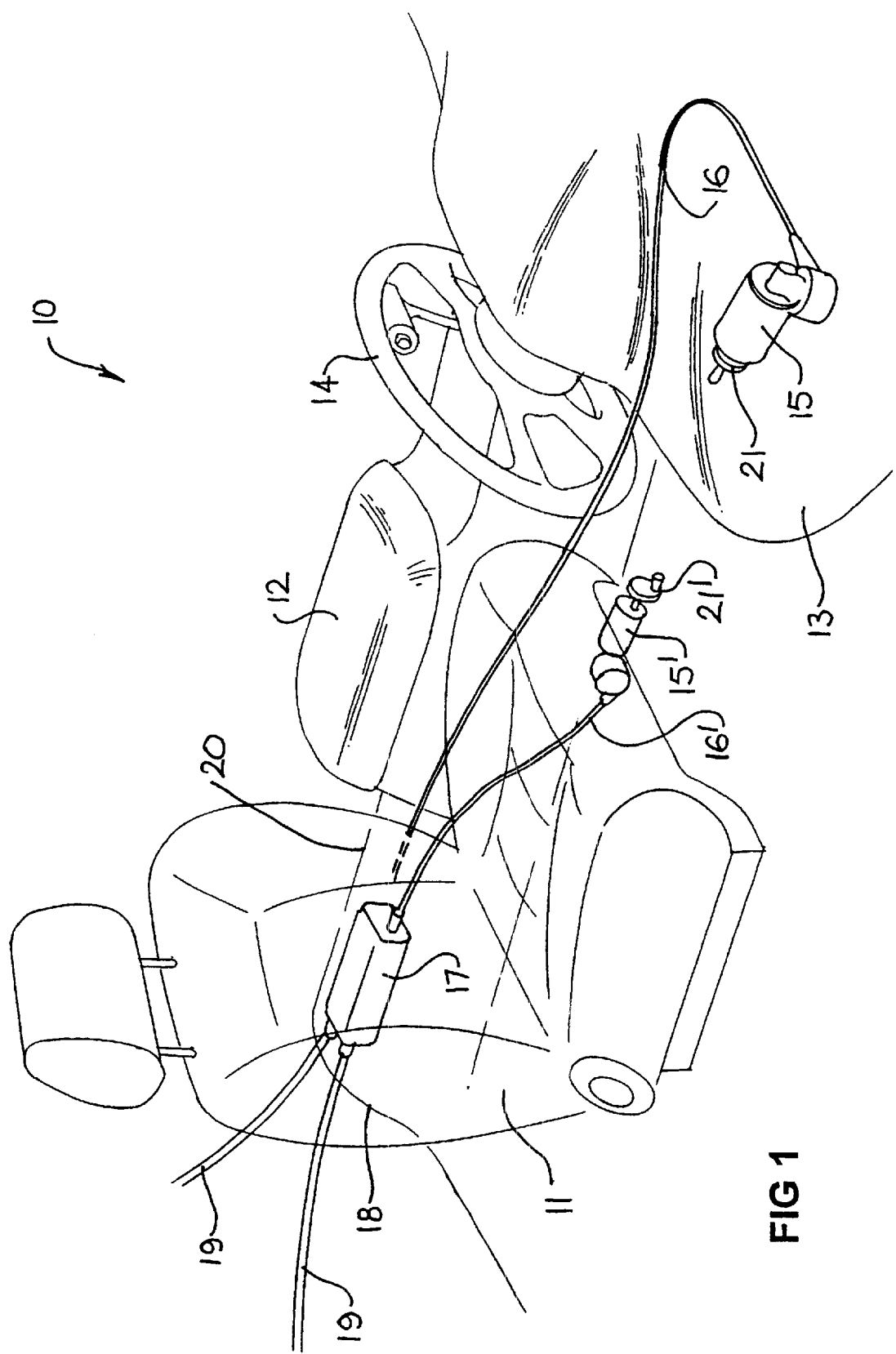
FIG. 1 is schematic view of a vehicle cabin which includes an electric parking brake actuator according to the invention.

FIG. 1 is a schematic view of the vehicle cabin 10 of a right hand drive automobile and shows the location of an electric parking brake actuator according to the invention. The vehicle cabin 10 includes a driver's seat 11, a centre console 12, a dash board 13 and a steering wheel 14. The electric parking brake actuator according to this embodiment of the invention includes an electric motor 15 which is mounted on or below the dash board 13, or the motor can be mounted below the seat 11 at 15'. In either case, a cable 16, 16' extends between the motor 15, 15' and a load multiplier 17, that is fixed to the undercarriage 18 of the automobile, outside the cabin 10.

A pair of cables 19 extend from the load multiplier 17 to parking brake assemblies mounted to act on each of the rear wheels of the automobile. The load multiplier is effective to multiply the load applied to the cable 16, 16' by an appropriate amount suitable to effectively actuate the parking brake assemblies. Thus, the cable 16, 16' undergoes reduced loading compared to the cables 19 and can therefore be a light grade cable. Conversely, the cables 19 are of a heavier grade suitable for the greater load applied thereto through the load multiplier. Accordingly, the cable 16, 16' has greater flexibility compared to the cables 19 and can be easily routed through the cabin 10 to position the motor 15, 15' and the load multiplier 17 where desirable. As shown in FIG. 1, the load multiplier 17 is mounted toward the end of the drive shaft channel 20, whereby the cables 19 can each extend substantially directly to the parking brake assemblies (not shown).

The electric parking brake actuator shown in FIG. 1 further includes facility for manual actuation of the parking brake assemblies as a safety feature should there be a failure that disables the electric operation of the actuator. Such failure could occur for example, in the electric motor 15, 15', or the power supply, or in the actuator control system. As shown in FIG. 1, the electric motors 15, 15' each include a rotatable wheel or handle 21, 21' and while the mechanism is not apparent from FIG. 1, rotation of the wheel 21, 21' is such as to pull on the cable 16, 16' and manually actuate or release the parking brake assemblies. Conveniently, the wheel 21, 21' is easily accessible to the driver who would manually engage and actuate the parking brake assemblies in the event of electric motor failure or power failure. It is preferred that the wheel 21, 21' be moved into an actuating position only when needed, so that at other times, it is disengaged from operation. That is preferred, because otherwise the wheel 21, 21' will rotate upon every actuation of the electric parking brake and the wheel would then be required to be carefully positioned, so as not to catch on anything within the cabin, such as driver clothing. Engagement of the wheel might be arranged simply by pushing it inwards against a biasing spring, that returns it to a disengaged position when released. A catch mechanism may be employed to maintain the wheel in the engaged position when necessary.

Figure 2:
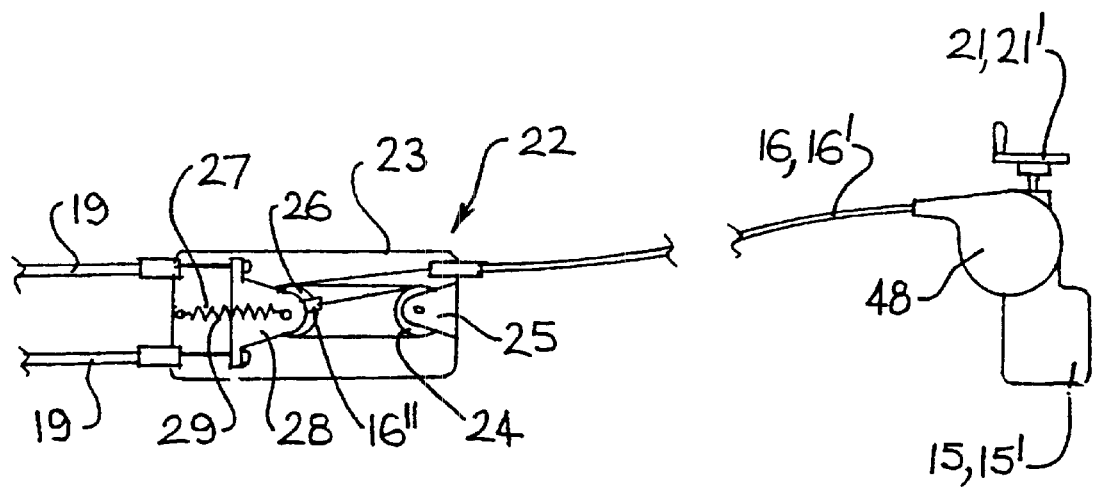
FIG. 2 shows a load multiplier for use in an electric parking brake actuator according to the invention.
Figure 3:
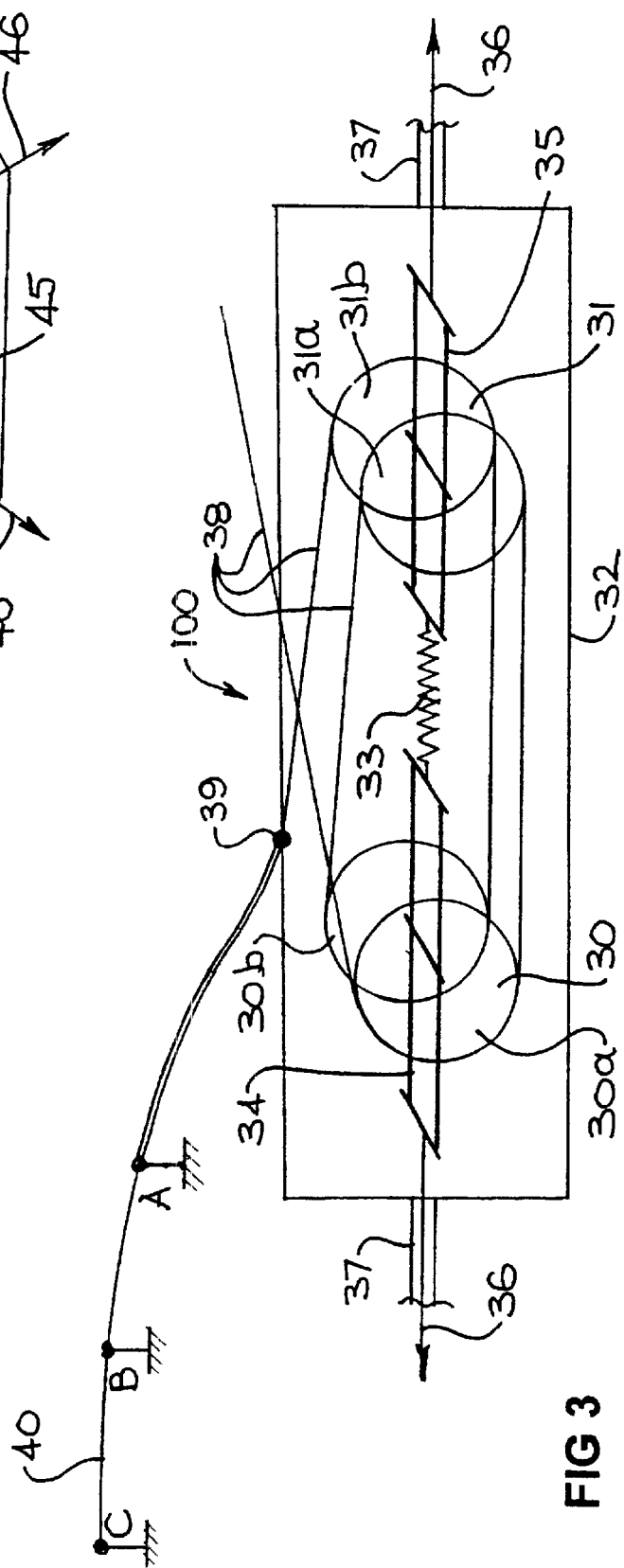

The load multiplier can take any suitable form and one form is shown in FIG. 2. In this figure, the load multiplier 22 includes a casing 23, a first pulley group 24 which is fixed to one end of the casing 23 on a bracket 25, and a second pulley group 26 which can float within the casing 23 by way of a spring arrangement 27. The spring arrangement 27 is effective to pre-tension the motor cable, to reduce slack and lost travel through that cable. Each pulley group includes a pair of pulleys as shown in FIG. 3, although a single pulley, or three or more pulleys could equally be employed, depending on the load multiplication factor that is required. The spring arrangement 27 includes a bracket 28 to which the pulley group 26 is mounted for rotation, and a spring 29 that extends between the axle of the pulley group 26 and an end wall of the casing 23. Cables 19 extend into connection with the bracket 28, and the outer conduit of those cables is fixed to or in abutting engagement with the casing 23 to permit relative movement of the inner cable that is fixed to the bracket 28. Means can be provided to constrain the pulley group 26 to linear movement toward and away from the pulley group 24 only. However, the stiffness of the cables 19 and the relatively short distance of movement of the pulley group 26 can be such as to provide a sufficient constraining effect.

Figure 2A:
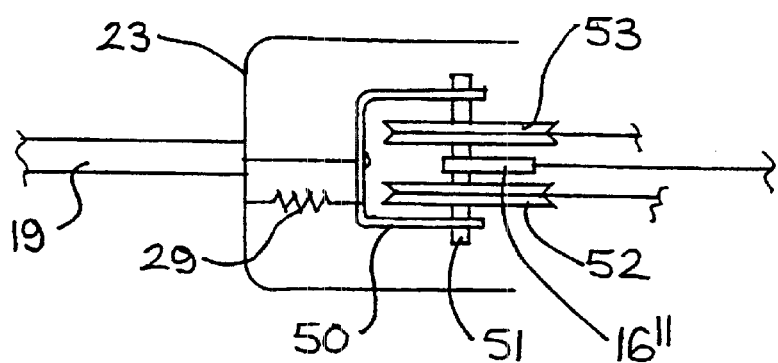
FIG. 2a shows the load multiplier of FIG. 2 rotated through 90°.

The arrangement of FIG. 2 is shown in FIG. 2a, rotated 90°. In FIG. 2a, it can be seen that the bracket 28 is formed by a yoke 50 to which a pulley axle 51 is secured and a pulley group comprising pulleys 52, 53 rotate thereabout. The yoke 50 is but one suitable arrangement for mounting the pulleys 52, 53 for rotation and therefore, any suitable pulley mounting structure may be employed. The cable extending about the pulleys 52, 53 extends to the opposite pulley group (not shown). The cable extending from the yoke 50 extends to a parking brake assembly. Alternatively, a pair of cables 19 may extend from the yoke 50 to extend in the manner shown in FIG. 1.

Referring to FIG. 2, one end of the cable 16, 16' is attached to the electric motor 15, 15' while the other end 16" is fixed to the bracket 28, or to the axle of the pulley group 26, or to a remote abutment (which will be described in relation to FIG. 3 in relation to remote anchor points A, B and C). The outer conduit of the cable 16, 16' is fixed or in abutting engagement with the casing 23. The cable 16, 16' extends out of the conduit, around the pulley group 26 and the pulley group 24 and to the anchored position 16". Actuation of the electric motor 15, 15' to apply the parking brake results in retraction of the cable 16, 16'. The electric motor can drive a winder drum, or other form of cable wind-up or take-up mechanism for retraction of the cable 16, 16'.

By this arrangement, the input load from the cable 16, 16' is multiplied and transmitted by the bracket 28 attached to the pulley group 26 to the cables 19, which actuate the respective parking brake assemblies. That transmission occurs by way of movement of the pulley group 26 and the bracket 28 toward the pulley group 24 against the biasing force of the spring 29. Upon release of the input load to release the parking brake, the spring 29 returns the pulley group 26 and the bracket 28 to a pre-loaded "brakes-off" position.

While the FIGS. 1 and 2 arrangements shows the electric motor 15, 15' separate from the load multiplier 22, they could be arranged to be connected together, or formed as an integral unit. If so, the cable 16, 16' would not be required.

FIG. 3 shows an alternative form of load multiplier 100 which includes a pair of pulley groups 30, 31, comprising pulleys 30a, 30b and 31a, 31b, which are arranged within a casing 32 to float toward and away from each other. Again, each pulley group includes two pulleys, although there could be a greater or lesser number of pulleys per group as required. The pulley groups 30, 31 are connected together by a compression spring 33 and brackets 34, 35 extend from the respective pulleys for connection to parking brake assembly cables 36. Each of the cables 36 is encased within a conduit 37 which may either abut the wall of the casing 32 or be fixed thereto.

A cable 38 extends between the electric motor (not shown) and the load multiplier 100 and extends about the pulley groups 30, 31 and is anchored to a suitable anchor 39. The compression spring 33 is effective to pretension the motor cable 38. A load placed on the cable 38 by an electric motor is multiplied and transmitted to the cables 36 and in the arrangement shown, the multiplication factor is 4 such that an input cable 38 load of 500N is transmitted through the cables 36 at a multiplied load of 2000N, less any efficiency losses.

In the FIG. 3 arrangement, the casing 32 is anchored to some part of the vehicle while the conduits encasing each of the cables 36 and 38 abut or are fixed to the casing against movement. Because the pulley groups 30 and 31 can float lengthwise of the casing 32, the load placed on each of the cables 36 is advantageously self-equalising.

The load multiplier 100 can also include a remote manual actuator which comprises a cable 40 encased within a conduit 41. The cable 40 may be an extension of the cable 38. Upon failure of the electric motor, the power supply or the actuator control system, the cable 38 is effectively anchored at one end by its connection to the motor. However, a manual load can be applied by the cable 40 to the other end of the cable 38 at the anchor 39. The application of a manual load through the cable 40 to the cable 38 applies a load to the cables 36 which is multiplied by the pulley arrangement. Alternatively, the cable 40 may be released to reduce or remove load, in the event that failure occurs when the parking brake is applied. The FIG. 3 arrangement therefore includes three remote anchor points A, B and C for the cable 40.

Anchor point A is a load released position of the cable 40 while anchor point C is the full load applied position. Anchor point B is the rest or home position of the cable 40 when the electric motor and power supply are functioning properly. Thus, the home position of the cable 40 is that position in which the electrically actuated parking brake arrangement is operational in a vehicle. The anchor points A, B and C can incorporate any suitable catch and release mechanism known in the art or related arts. For example, sheet anchors employed in yachting equipment may be appropriate. The anchors may also be formed at any suitable position along the cable length, although the more likely position is toward or at the end of the cable 40 remote from the anchor 39. The anchor points A, B and C are but one example arrangement for use in the FIG. 3 embodiment. In alternative arrangements, a greater number of anchor points may be provided, or the arrangement may be such as to have no specific anchor points, but permit anchoring at any point. Sheet anchors may be employed in such an arrangement.

In a preferred arrangement, a suitable mechanism is employed to enable the cable to be anchored at any point between the anchor points B and C, so that it is not necessary to apply a full braking load during failure conditions, if a lesser load is all that is required. It may be for example, that the motor has failed after partial load application, or that the drum/friction lining clearance will not permit a full load to the applied. Alternatively, application of the full load may not be possible by certain persons, such as the elderly or disabled, or the full load may not be required in the event that failure occurs when the vehicle is on a horizontal or only slightly inclined surface. Any suitable mechanism, such as a ratchet mechanism, may be employed for this purpose. The above arrangement is not considered necessary between the anchor points A and B, because the movement between points A and B is a release movement that requires minimum effort from the operator. However, a similar arrangement can be employed between points A and B if considered desirable.

Conveniently, the load multiplier 100 enables the electric motor to be located remote from the manual cable 40, so that the motor can be mounted wherever desirable, but the manual cable 40 can separately be located for ease of manual operation by the driver.

Figure 4:
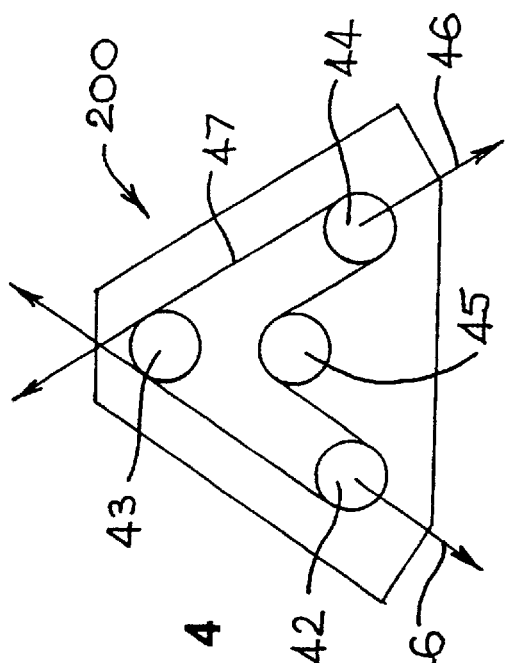
FIGS. 3 and 4 show alternative forms of load multipliers according to the invention.

A further alternative arrangement of the load multiplier is shown in FIG. 4, and the load multiplier 200 shown in that figure includes four pulley groups 42 to 45 mounted in any suitable manner. Like previous embodiments, each pulley group includes two pulleys, although the groups could each comprise a single pulley or three or more pulleys as desirable for load multiplication. As shown, assembly cables 46 extend from each of the pulley groups 42 and 44, while a cable 47 extends about the pulleys 42 to 45. The cable 47 has one end thereof connected to an electric motor and the other end connected to a manual actuator. Advantageously, it can be seen from this figure that the direction of the assembly cables 46 can be angled and it will be appreciated that the angle of those cables can be changed by altering the position of the pulley groups 42 to 45. By this arrangement, the assembly cables 46 can extend from the load multiplier 200 directly to the parking brake assemblies, as opposed to the arrangement shown in FIG. 2 for example, in which the cables 19 extending from the load multiplier have to be re-routed to the parking brake assemblies. The arrangement of FIG. 4 might still be re-routed, but there may be no necessity for this.

The load multipliers shown in each of FIGS. 1 to 4, can each form the sole load multiplying facility, or can be assisted by an additional load multiplying facility. Such an additional facility may be provided at any suitable position, such as along the cable path intermediate the electric motor 15, 15' and the load multiplier 17. Alternatively, the electric motor may directly drive such an additional facility. Referring to FIG. 2, the electric motor 15, 15' drives a drum within the casing 48 which can be arranged to multiply the load applied by the motor to the cable 16, 16'. Alternatively, the electric motor 15, 15' may drive a worm gear that applies a multiplied load to the cable 16, 16'. Still alternatively, the motor 15, 15' may drive a different type of gear arrangement, or a nut and screw drive, or even a pulley arrangement, to multiply the load applied to the cable 16, 16'. Thus, in this arrangement, the load ultimately applied to the parking brake assemblies is applied through a two-stage multiplication process. It will be appreciated that more than two load multiplication facilities may be provided as necessary.

The invention described herein is susceptible to variations, modifications and/or additions other than those specifically described and it is to be understood that the invention includes all such variations, modifications and/or additions which fall within the spirit and scope of the above description.

What is claimed is:

1. An electric brake actuator for actuating a brake arrangement, said actuator including an electric drive unit and a load multiplier, said electric drive unit being in cable connection through a first cable unit with said load multiplier and said load multiplier being arranged for cable connection through a second cable unit with said brake arrangement, whereby said electric drive unit is operable to apply a load to said load multiplier through said first cable unit and said load multiplier is operable to multiply said load for application to said brake arrangement through said second cable unit, wherein said load multiplier includes a pair of pulley groups, each group including one or more pulleys mounted for rotation, a first of said pulley groups being anchored against shifting movement relative to a second of said pulley groups, said second of said pulley groups being mounted for movement relative to said first pulley group toward and away therefrom, said first cable unit extending about said first and second pulley groups and being anchored at said load multiplier, said second cable unit extending from said second pulley group.

2. An electric brake actuator according to claim 1, wherein said brake arrangement is a parking brake arrangement applied to a vehicle.

3. An electric brake actuator according to claim 1 wherein said drive unit is an electric motor.

4. An electric brake actuator according to claim 1, said first cable unit employing cable of lighter grade than that employed for connection between said load multiplier and said brake arrangement.

5. An electric brake actuator according to claim 1, said load multiplier being manually operable for manual application of a load to said brake arrangement.

6. An electric brake actuator according to claim 5, including a cable which is operable to manually actuate said electric drive unit to apply a load to said load multiplier.

7. An electric brake actuator according to claim 5, said cable extending from an end of a cable of said first cable unit.

8. An electric brake actuator according to claim 5, including a cable which is manually operable to directly actuate said load multiplier.

9. An electric brake actuator according to claim 5, said load multiplier being manually applied by a load applied to said first cable unit intermediate said electric drive unit and said load multiplier.

10. An electric brake actuator according claim 1, wherein said drive unit includes a supplementary load multiplier.

11. An electric brake actuator according to claim 1, said brake arrangement including two brake assemblies operable on each of two wheels of a vehicle and said second cable unit including two cables for extending from said load multiplier separately to one each of said two brake assemblies.

12. An electric brake actuator according to claim 1, said brake arrangement including two brake assemblies operable on each of two wheels of a vehicle and said second cable unit including a single cable extending from said load multiplier into connection with a cable arrangement which includes two cables for extending separately to one each of said brake assemblies.

13. An electric brake actuator according to claim 1, said actuator including a further load multiplier between said electric drive unit and the first said load multiplier.

14. An electric brake actuator for actuating a brake arrangement, said actuator including an electric drive unit and a load multiplier, said electric drive unit being in cable connection through a first cable unit with said load multiplier and said load multiplier being arranged for cable connection through a second cable unit with said brake arrangement, whereby said electric drive unit is operable to apply a load to said load multiplier through said first cable unit and said load multiplier is operable to multiply said load for application to said brake arrangement through said second cable unit, said load multiplier including a pair of pulley groups, each pulley group including one or more pulleys, each of said pulley groups being mounted to float linearly toward and away from each other, said first cable unit being anchored at said load multiplier and said second cable unit including a cable extending from each of said pulley groups for connection to a brake assembly operable on each of two wheels of a vehicle, wherein a load applied by said first cable unit to said load multiplier causes a shift in the relative position of said pulley groups towards each other and by that shifting movement, an actuating load is applied to each of said parking brake assemblies.

15. An electric brake actuator for actuating a brake arrangement, said actuator including an electric drive unit and a load multiplier, said electric drive unit being in cable connection through a first cable unit with said load multiplier and said load multiplier being arranged for cable connection through a second cable unit with said brake arrangement, whereby said electric drive unit is operable to apply a load to said load multiplier through said first cable unit and said load multiplier is operable to multiply said load for application to said brake arrangement through said second cable unit, said brake arrangement including two brake assemblies, and said load multiplier including a first pair of pulley groups, and a second pulley group having at least a single pulley disposed between said first pulley group pair, said second cable unit including two cables one each of which extends from a respective pulley group of said first pulley group pair for respective connection to said brake assemblies, and said first cable unit including a cable which extends about the pulleys of each of said first and second pulley groups, opposite ends of said cable of said first cable unit being connected respectively to said electric drive unit and to a manual actuator, so that a load may be applied to said load multiplier separately by either of said electric drive unit or said manual actuator.

16. An electric brake actuator for actuating a brake arrangement, said actuator including an electric drive unit and a load multiplier, said electric drive unit being in cable connection through a first cable unit with said load multiplier and said load multiplier being arranged for cable connection through a second cable unit with said brake arrangement, whereby said electric drive unit is operable to apply a load to said load multiplier through said first cable unit and said load multiplier is operable to multiply said load for application to said brake arrangement through said second cable unit, said brake arrangement including two brake assemblies, and said load multiplier including a first pair of pulley groups and a second pair of pulley groups, each pulley group of said second pulley group pair being arranged substantially along a center-line between said first pulley group pair and said pulley groups of said second pulley group pair being laterally offset different amounts along said center-line in substantially the same plane as the cable path between said first pulley group, said second cable unit including two cables one each of which extends from a respective pulley group of said first pulley group pair for respective connection to said brake assemblies, and said first cable unit including a cable which extends about the pulleys of each of said first and second pulley groups, opposite ends of said cable of said first cable unit being connected respectively to said electric drive unit and to a manual actuator, so that a load may be applied to said load multiplier separately by either of said electric drive unit or said manual actuator.

17. A vehicle having an electric brake actuator for actuating a brake arrangement thereof, said actuator including an electric drive unit and a load multiplier, said electric drive unit being in cable connection through a first cable unit with said load multiplier and said load multiplier being in cable connection through second cable unit with said brake arrangement, whereby said electric drive unit is operable to apply a load to said load multiplier and said load multiplier is operable to multiply said load and apply said multiplied load to said brake arrangement, via said respective cable connections, wherein said load multiplier including a pair of pulley groups, each group including one or more pulleys mounted for rotation, a first of said pulley groups being anchored against shifting movement relative to a second of said pulley groups, said second of said pulley groups being mounted for movement relative to said first pulley group toward and away therefrom, said first cable unit extending about said first and second pulley groups and being anchored at said load multiplier, said second cable unit extending from said second pulley group.

18. A vehicle according to claim 17, said brake arrangement being a parking brake arrangement.

19. A vehicle according to claim 17, said electric drive unit being positioned to be accessible to the driver of said vehicle when positioned in the driving position and said electric drive unit being manually actuable by said driver to apply a load to said load multiplier upon failure of operation of said electric drive unit.

20. A vehicle according to claim 17, said electric drive unit being positioned remote from the driving position of the vehicle, and a manual actuator being connected to said electric drive unit for manual actuation thereof, and said manual actuator being positioned to be accessible to the driver of said vehicle in said driving position, to apply a load to said load multiplier upon failure of operation of said electric drive unit.

21. A vehicle according to claim 17, said brake arrangement being a parking brake arrangement and said vehicle including anchor points for anchoring a cable for manually actuating said load multiplier, said anchoring points defining at least three conditions of parking brake operation, namely a first fully applied condition, a second fully released condition and a third condition intermediate said first and second conditions and defining the operative condition of said parking brake arrangement ready for parking brake application.

22. A vehicle according to claim 21, including an anchoring arrangement permitting cable to be anchored at any position between said first and second conditions.

23. A vehicle according to claim 17, said load multiplier being positioned towards the brake arrangement of said vehicle.

* * * * *